United States Patent
Lee

(10) Patent No.: US 8,872,959 B2
(45) Date of Patent: Oct. 28, 2014

(54) DIGITAL PHOTOGRAPHING APPARATUS, METHOD OF CONTROLLING THE SAME, AND RECORDING MEDIUM HAVING RECORDED THEREON PROGRAM FOR EXECUTING THE METHOD

(75) Inventor: Jang-won Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 300 days.

(21) Appl. No.: 13/297,940

(22) Filed: Nov. 16, 2011

(65) Prior Publication Data

US 2012/0249857 A1 Oct. 4, 2012

(30) Foreign Application Priority Data

Mar. 30, 2011 (KR) .................. 10-2011-0029031

(51) Int. Cl.
| | |
|---|---|
| *H04N 5/222* | (2006.01) |
| *H04N 5/225* | (2006.01) |
| *G02B 7/10* | (2006.01) |
| *H04N 5/232* | (2006.01) |
| *H04N 5/238* | (2006.01) |
| *G03B 17/14* | (2006.01) |

(52) U.S. Cl.
CPC ............. *G02B 7/102* (2013.01); *G03B 17/14* (2013.01); *H04N 5/23209* (2013.01); *H04N 5/23293* (2013.01); *H04N 5/238* (2013.01); *H01N 5/23296* (2013.01); *H01N 5/23216* (2013.01)
USPC .................. 348/333.11; 348/207.99

(58) Field of Classification Search
CPC ........................................ H04N 5/225
USPC ................. 348/330.08, 333.11, 340, 341, 335
See application file for complete search history.

(56) References Cited

U.S. PATENT DOCUMENTS

| | | | | |
|---|---|---|---|---|
| 7,245,325 | B2* | 7/2007 | Yamaguchi | 348/364 |
| 8,081,251 | B2* | 12/2011 | Kido et al. | 348/333.11 |
| 2002/0105589 | A1 | 8/2002 | Brandenberger et al. | |
| 2005/0041123 | A1* | 2/2005 | Ansari et al. | 348/264 |
| 2005/0190264 | A1 | 9/2005 | Neal | |
| 2007/0024740 | A1 | 2/2007 | Strong | |
| 2009/0051792 | A1* | 2/2009 | Arimoto et al. | 348/251 |
| 2012/0069179 | A1* | 3/2012 | Gish | 348/143 |

FOREIGN PATENT DOCUMENTS

KR 1020090067912 6/2009

\* cited by examiner

*Primary Examiner* — Trung Diep
(74) *Attorney, Agent, or Firm* — The Farrell Law Firm, P.C.

(57) ABSTRACT

A Digital photographing apparatus having a replaceable lens mounted thereon, a method of controlling the digital photographing apparatus, and a recording medium having recorded thereon a program for executing the method are provided. The digital photographing apparatus includes an imaging device generating an image signal by imaging light through the mounted lens, a user interface receiving a selection of a user of one of a plurality of replaceable lenses, a reading unit reading specification information regarding the selected lens, a changing unit changing the image signal based on the read specification information regarding the selected lens, and a display unit displaying the changed image signal as a preview image.

20 Claims, 7 Drawing Sheets

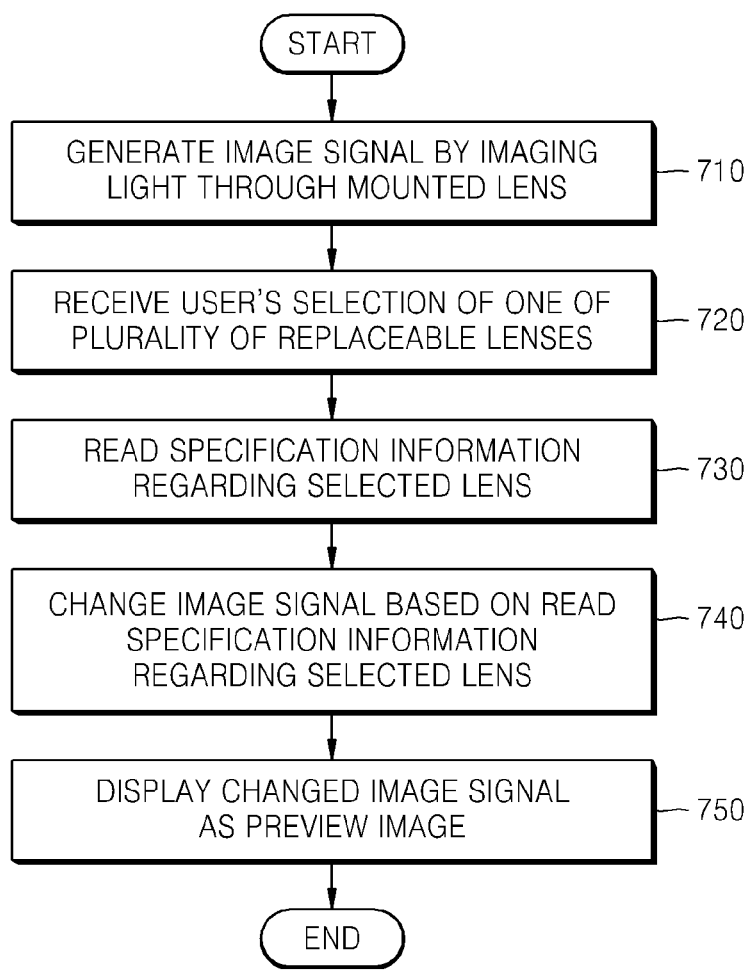

DIGITAL PHOTOGRAPHING APPARATUS, METHOD OF CONTROLLING THE SAME, AND RECORDING MEDIUM HAVING RECORDED THEREON PROGRAM FOR EXECUTING THE METHOD

PRIORITY

This application claims priority under 35 U.S.C. §119 to Patent Application No. 10-2011-0029031, filed on Mar. 30, 2011 in the Korean Intellectual Property Office, the entire disclosure of which is incorporated herein in by reference.

BACKGROUND OF THE INVENTION

1. Field of the Invention

The present invention relates generally to a digital photographing apparatus, a method of controlling the same, and a recording medium having recorded thereon a program for executing the method. More particularly, the present invention relates to a replaceable-lens digital photographing apparatus by which a user can preview effects provided by a new lens through a preview screen of the digital photographing apparatus before physically replacing a current lens with another one, a method of controlling the digital photographing apparatus, and a recording medium having recorded thereon a program for executing the method.

2. Description of the Related Art

Regarding replaceable-lens digital photographing apparatuses, different images having different effects may be obtained from the same object depending on characteristics of lenses mounted on the digital photographing apparatuses.

A user of a replaceable-lens digital camera may replace an existing lens with one that is appropriate for a distance from an object and a light intensity in the photographing environment. A skilled photographer can find a lens appropriate for current photographing conditions and replace an existing lens with such appropriate lens, but an inexperienced photographer may not able to determine an appropriate lens and, thus, may have to change lenses unnecessarily several times.

SUMMARY OF THE INVENTION

The present invention provides a replaceable-lens digital photographing apparatus by which a user can preview effects provided by a new lens through a preview screen of the digital photographing apparatus before physically replacing a current lens with another one, a method of controlling the digital photographing apparatus, and a recording medium having recorded thereon a program for executing the method.

According to an aspect of the present invention, a method of controlling a digital photographing apparatus having a replaceable lens mounted thereon is provided, the method including generating an image signal by imaging light through the mounted lens, receiving a user's selection of one of a plurality of replaceable lenses, reading specification information regarding the selected lens, changing the image signal based on the read specification information regarding the selected lens, and displaying the changed image signal as a preview image.

The method may further include storing specification information regarding at least one of the plurality of replaceable lenses and displaying the stored specification information regarding the at least one lens to allow the user to select the displayed specification information.

The method may further include searching for specification information regarding at least one of the plurality of replaceable lenses through near-field communication with the at least one lens and displaying the found specification information regarding the at least one lens to allow the user to select the displayed specification information.

The method may further include downloading specification information regarding at least one of the plurality of replaceable lenses from an external server through a network and displaying the downloaded specification information regarding the at least one lens to allow the user to select the displayed specification information.

The method may further include receiving a digital zoom signal regarding the displayed preview image, enlarging or downsizing the changed image signal based on the input digital zoom signal and the specification information regarding the selected lens, and displaying the enlarged or downsized image signal as the preview image.

The method may further include receiving an aperture value regarding the displayed preview image, adjusting a brightness of the changed image signal based on the specification information regarding the selected lens and the aperture value, and displaying the brightness adjusted image signal as the preview image.

According to another aspect of the present invention, a digital photographing apparatus having a replaceable lens mounted thereon is provided, the digital photographing apparatus including an imaging device for generating an image signal by imaging light through the mounted lens, a user interface for receiving a user's selection of one of a plurality of replaceable lenses, a reading unit for reading specification information regarding the selected lens, a changing unit for changing the image signal based on the read specification information regarding the selected lens, and a display unit for displaying the changed image signal as a preview image.

The digital photographing apparatus may further include a memory for storing specification information regarding at least one of the plurality of replaceable lenses and a display unit for displaying the stored specification information regarding the at least one lens to allow the user to select the displayed specification information.

The digital photographing apparatus may further include a network unit for searching for specification information regarding at least one of the plurality of replaceable lenses through near-field communication with the at least one lens, in which the display unit displays the found specification information regarding the at least one lens to allow the user to select the displayed specification information.

The digital photographing apparatus may further include a network unit for downloading specification information regarding at least one of the plurality of replaceable lenses from an external server through a network, in which the display unit displays the downloaded specification information regarding the at least one lens to allow the user to select the displayed specification information.

The digital photographing apparatus may further include a display unit for displaying the mounted lens and all or some of the plurality of replaceable lenses, which are not mounted.

According to another aspect of the present invention, a recording medium is provided having recorded thereon the above-described method as a computer-readable code.

BRIEF DESCRIPTION OF THE DRAWINGS

The above and other features and advantages of the present invention will become more apparent by describing in detail embodiments thereof with reference to the attached drawings in which:

FIG. 7 is a flowchart briefly illustrating a method of controlling a digital photographing apparatus according to an embodiment of the present invention.

DETAILED DESCRIPTION OF EMBODIMENTS OF THE PRESENT INVENTION

Hereinafter, embodiments of the present invention will be described in detail with reference to the accompanying drawings.

Figure 1:
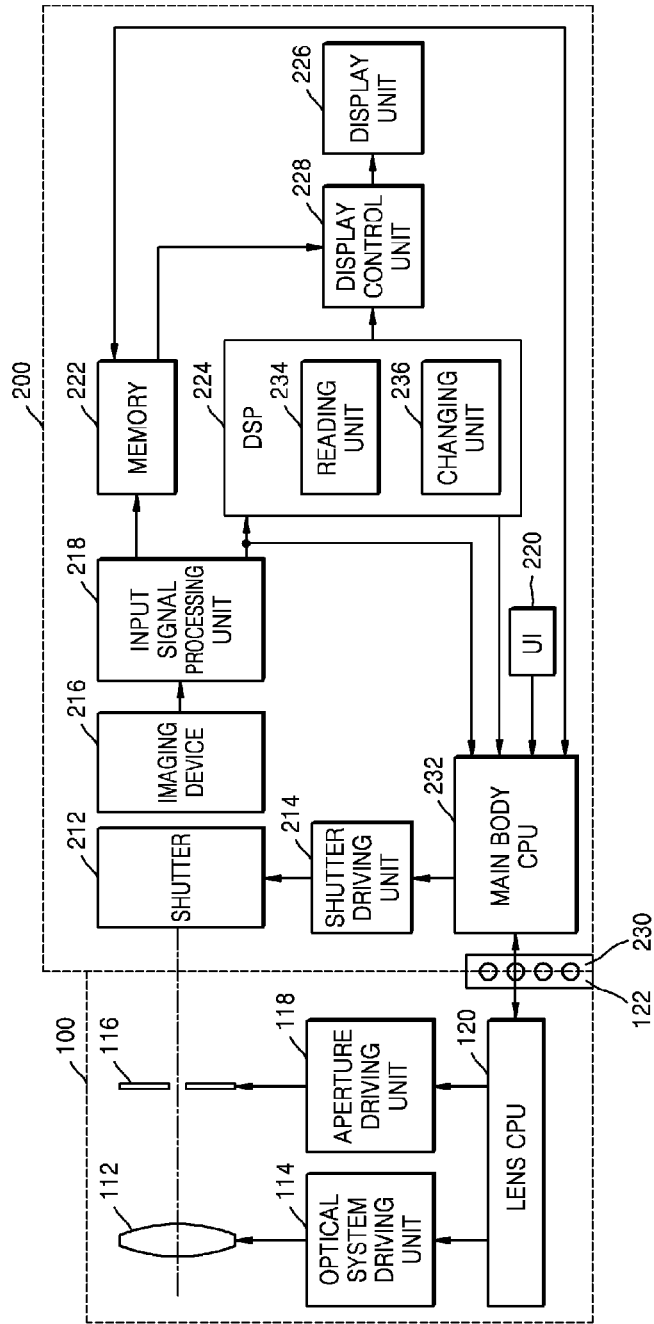
FIG. 1 is a block diagram illustrating a digital photographing apparatus according to an embodiment of the present invention.

FIG. 1 illustrates a block diagram of a digital photographing apparatus according to an embodiment of the present invention. Referring to FIG. 1, although it is shown that a replaceable lens 100 and a main body portion 200 are separately configured and are electrically connected to each other by a communication pin, they may also be formed integrally.

In the current embodiment, different components may be implemented with separate chips or multiple components may be implemented on a single chip.

Structure of Replaceable Lens 100

The replaceable lens 100 (lens 100) may include a photographing optical system 112, an optical system driving unit 114, an aperture 116, an aperture driving unit 118, a lens Central Processing Unit (CPU) 120, and a lens mount 122.

The photographing optical system 112 collects light from an object. The photographing optical system 112 includes a zoom lens for reducing or increasing an angle of view according to a focal length and a focus lens for adjusting a focus on the object, and the zoom lens and the focus lens may be a single lens or a plurality of lenses.

The aperture 116 regulates an intensity (or light intensity) of the light signal before the light signal arrives at an imaging device 216. The aperture 116 may be automatically set by the digital photographing apparatus or may be set by a photographer, and is controlled by a control motor (not shown), which controls aperture 115 according to a set value.

The lens CPU 120 controls overall elements of the replaceable lens 100. The optical system driving unit 114 and the aperture driving unit 118 are controlled by the lens CPU 120 to control the photographing optical system 112 and the aperture 116, respectively.

The lens mount 122 includes a communication pin for lens 100.

Structure of Main Body Portion 200

The main body portion 200 may include a shutter 212, a shutter driving unit 214, the imaging device 216, an input signal processing unit 218, a User Interface (UI) 220, a memory 222, a Digital Signal Processor (DSP) 224, a display control unit 228, a display unit 226, a main body mount 230, and a main body CPU 232.

The shutter 212 controls input of the optical signal. The shutter 212 may be a mechanical shutter having a cover that moves up and down. Instead of using the mechanical shutter 212, a function of the shutter 212 may be performed by controlling an electric signal being input to the imaging device 216.

The imaging device 216 receives the optical signal passed through the shutter 212 and forms an image of the object. The imaging device 216 may be a Complementary Metal Oxide Semiconductor (CMOS) sensor array, a Charge Coupled Device (CCD) sensor array, or the like.

The input signal processing unit 218 may further include an Analog-to-Digital (A/D) converter which digitalizes an analog electric signal provided from the imaging device 216. The input signal processing unit 218 may also include a circuit which performs gain adjustment or signal processing for normalizing a waveform regarding the electric signal provided from the imaging device 216.

The UI 220 may include a means of input allowing a user to manipulate the digital photographing apparatus or perform various settings during photographing. For example, the UI 220 may be implemented with a button, a key, a touch panel, a touch screen, a dial, and the like, so that the user can input a user control signal, such as for power on/off, photographing start/stop, play start/stop/search, driving of the photographing optical system 112, mode switch, menu manipulation, selection manipulation, and so forth.

When the UI 220 is implemented with a touch screen, various changes may be possible so that, for example, the UI 220 may be integrated with the display unit 226.

In the current embodiment, the user may enter a lens selection guide mode by using the UI 220. The user may also select one of a plurality of replaceable lenses. The replaceable lenses include not only lenses currently owned by the user, but also lenses not currently owned by the user that can be used in the digital photographing apparatus.

The user may adjust an angle of view of a preview image by inputting digital zoom magnification information through the UI 220.

The user may adjust a brightness of the preview image by inputting a value for the aperture 116 through the UI 220. Additionally, the user may input a resolution value and a chromatic aberration value through the UI 220.

The memory 222 temporarily stores image data or data necessary to operate. The memory 222 may include Synchronous Dynamic Random Access Memory (SDRAM), Multi Chip Package (MCP), Dynamic Random Access Memory (DRAM), or the like. The memory 222 may also store an operating system or an application program necessary to operate the digital photographing apparatus. To this end, the memory 222 may include Electrically Erasable Programmable Read-Only Memory (EEPROM), a flash memory, Read-Only Memory (ROM), or the like.

The memory 222 stores an image file including an image formed by the digital photographing apparatus. To this end, the memory 222 may include a device removable from the digital photographing apparatus. For example, the memory 222 may use a Secure Digital (SD) card/MultiMedia Card (MMC), a Hard Disk Drive (HDD), an optical disk, an optical magnetic disk, a hologram memory, or the like.

The memory 222 may store specification information unique to a replaceable lens. The memory 222 may also store specification information regarding a lens input from an external device through a network unit 238 to be described later.

In the current embodiment, the specification information may include focal length information, an F-Number, an open cross-section contraction value, etc.

The DSP 224 generates a preview image or a captured image that can be displayed on the display unit 226 by performing a series of image signal processing operations. Each component of the digital photographing apparatus may be controlled by the DSP 224 according to the signals input by a user through the UI 220.

The image signal processing operations may include noise reduction for image data and image signal processing for quality improvement, such as gamma correction, color filter array interpolation, color matrix, color correction, color enhancement, and the like.

An image file may be generated by compressing image data generated through the image signal processing for quality improvement, and the image data may be restored from the image file. An image compression format may be a reversible format or an irreversible format. An example of an appropriate compression format may be a Joint Photographic Experts Group (JPEG) format or a JPEG 2000 format.

As the image signal processing, indistinctness processing, chrominance processing, blur processing, edge emphasis processing, image analysis processing, image recognition processing, image effect processing, and the like may be functionally performed.

Further, the DSP 224 may also perform display image signal processing for displaying an image on the display unit 226. The DSP 224 may include a changing unit 236 for changing an image signal formed by the imaging device 216 and a reading unit 234 for reading specification information of a lens.

However, various changes may be possible. For example, the changing unit 236 and the reading unit 234 may be separate components from the DSP 224. In other words, such changes may be made as long as the digital photographing apparatus according to the current embodiment of the present invention includes the changing unit 236 and the reading unit 234.

The reading unit 234 may read specification information regarding a lens selected by the user from among lenses that are not currently mounted on the lens mount 122 from the memory 222. The specification information regarding the selected lens may also be read from the lens itself or an external server, as well as from the memory 222.

The changing unit 236 may change an image signal based on the specification information about the selected lens read by the reading unit 234.

For example, the changing unit 236 may perform various image signal processing operations such as digital amplification (digital gain adjustment), color correction, gamma (γ) correction, contrast correction, preview display image generation, and so forth on the image signal.

The changing unit 236 may perform a digital zoom operation for enlarging or downsizing an image corresponding to the image signal.

As a result, the user may view, in real time, a preview image corresponding to the image signal changed based on the specification information regarding the selected lens, without needing to actually mount the selected lens on the lens mount 122.

Moreover, in the current embodiment, the user may manipulate the digital photographing apparatus by using the UI 220 as if the selected lens is actually mounted, to check an angle of view, a focal length, a brightness, and the like.

Digital zooming, and not optical zooming, is generally performed. When the user inputs magnification information regarding digital zooming through the UI 220, the changing unit 236 may enlarge or reduce the image signal according to the magnification information. To this end, the changing unit 236 may include an image scaler (not shown).

The changing unit 236 adjusts a gain of the imaging device 216 by referring to the value for the aperture 116 selected by the user through the UI 220, such that an image signal obtained through brightness adjustment using a selected lens, which is not actually mounted, can be output in real time.

An image from image data output from the DSP 224 is transmitted through the memory 222 to the display control unit 228, or directly to the display control unit.

The display control unit 228 controls the display unit 226 to display an image or an icon thereon. For example, a Liquid Crystal Display (LCD), an Organic Light Emitting Diode (OLED), a Plasma Display Panel (PDP), an EDD (E3 identified by differential display), or the like may be used as the display unit 226.

For example, the display unit 226 may display unique specification information regarding lenses in the form of icons that can be selected by the user.

The main body mount 230 may include a communication pin for the main body portion 200.

The communication pin included in the lens mount 122 and the communication pin included in the main body mount 230 have matching positions, and various indications and data is transmitted through the communication pins.

The main body CPU 232 controls overall operations of the main body portion 200. Although the main body portion CPU 232 is shown as being separated from the DSP 224 in FIG. 2, they may be formed integrally as one piece.

Thus, the digital photographing apparatus, according to the present invention, allows the user to conveniently replace a lens with another lens and photograph an object by reducing trial and error when the user replaces the lens, based on a preview screen and specification information regarding each lens.

In other words, even if a current existing lens is physically replaced with a user-selected lens, the user may view a preview screen to which specification information regarding the selected lens is applied and view a screen corresponding to when zooming is actually performed by the selected lens by using digital zooming, thereby easily replacing the current lens with an appropriate lens.

Moreover, the user may view the preview screen to which the specification information regarding the selected lens is applied and view a screen corresponding to a brightness being actually adjusted according to an aperture value of selected lens, thereby easily replacing the current lens with an appropriate lens.

Furthermore, since replaceable lenses that may be selected by the user also include lenses that are not currently owned by the user, they may be referred to when the user purchases a new lens in the future.

Structure of Network Unit 238

Figure 2:
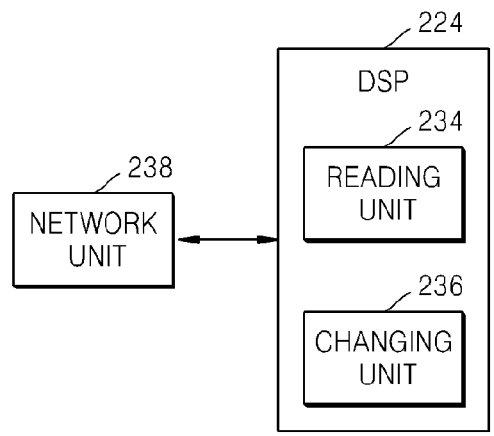
FIG. 2 is a block diagram illustrating a digital photographing apparatus according to another embodiment of the present invention.

FIG. 2 is a block diagram for describing a digital photographing apparatus according to another embodiment of the present invention. Repeated or unnecessary illustrations and descriptions will not be provided for clarity.

According to another embodiment of the present invention, the digital photographing apparatus may further include the network unit 238. While the network unit 238 is shown separately in FIG. 2, it is merely an example, and the digital photographing apparatus may include a network function unit.

The network unit 238 transmits or receives data to or from an external server and a lens in response to a command from the main body CPU 232.

The network unit 238 may download new lens specification information from the external server to the digital photographing apparatus. For example, the network unit 238, if a model name of a lens is known, may access a web server through the Internet and download specification information regarding the lens to the memory 222.

The network unit 238 may search for a type of a lens currently owned by the user and specification information regarding the lens through communication with the lens by using Zigbee, WiFi, or Bluetooth communication.

Structure of Preview Screen after User's Lens Selection

Next, a structure of a preview screen according to a scenario of the present invention will be described with reference to FIGS. 3 through 6B. However, such a structure is merely an example of the present invention, and the present invention is not limited to such example.

First, upon starting an operation of the digital photographing apparatus, a preview screen is displayed. A preview display image signal is directly provided to the DSP 224, and image signal processing such as pixel interpolation is performed. The image signal, after having undergone the image signal processing, is displayed on the display unit 226 through the display control unit 228.

1. Lens Selection

When the user desires to know characteristics of a replacement lens before physically replacing the lens 100 with the replacement lens, the user enters a lens selection guide mode by using the UI 220.

Figure 3:
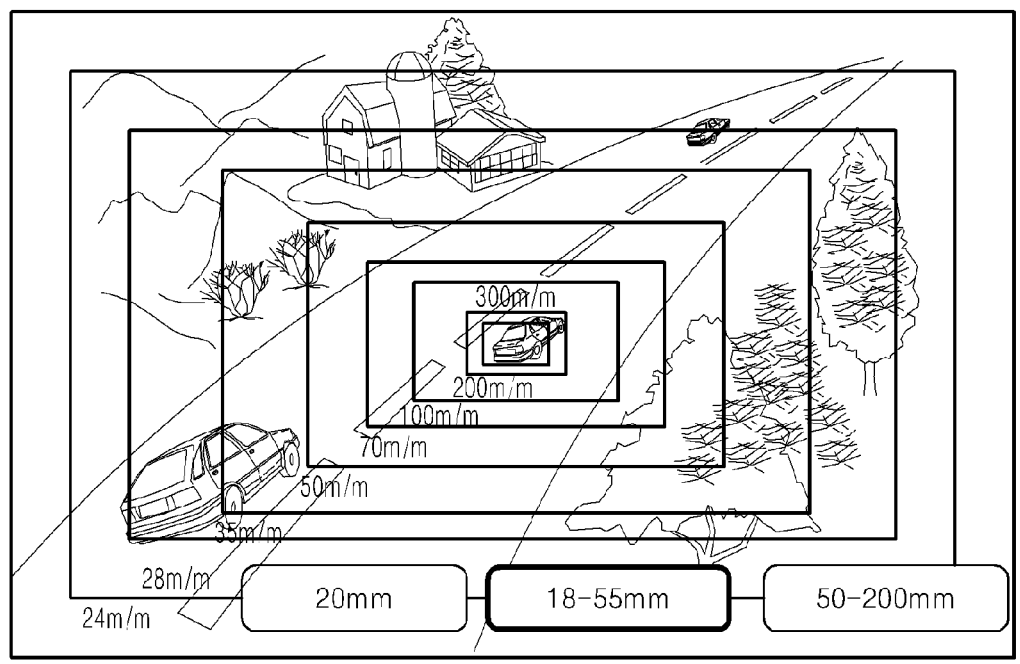
FIGS. 3 through 6B are diagrams illustrating a preview screen after a user's selection of a lens according to an embodiment of the present invention.

Referring to FIG. 3, the display unit 226 (or the UI 220 implemented with a touch screen) displays lenses which the user currently has in the form of icons in a lower portion of the screen, e.g., a lens having a focal length of 20 mm (a 20 mm lens), a lens having a focal length of 18-55 mm (an 18-55 mm lens), and a lens having a focal length of 50-200 mm (a 50-200 mm lens).

The user then selects a desired lens, for example, the lens having a focal length of 18-55 mm, on the displayed screen.

2. When Lens having Shorter Focal Length than Mounted Lens 100 is Selected

Figure 4A:
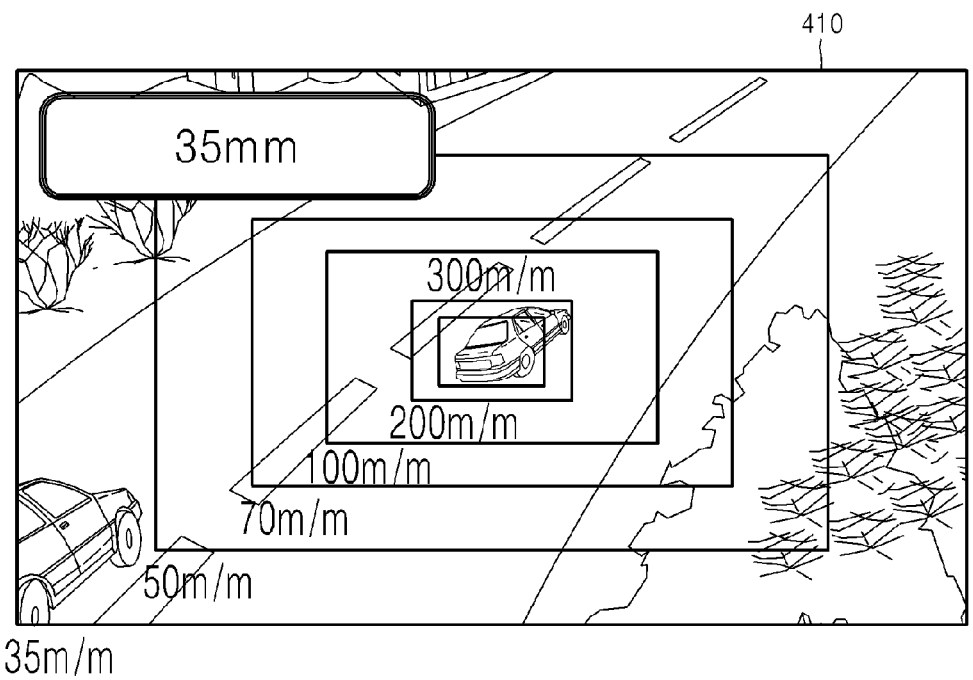

FIG. 4A shows a preview screen 410 when the digital photographing apparatus having a 35 mm lens mounted thereon is powered on.

Figure 4B:
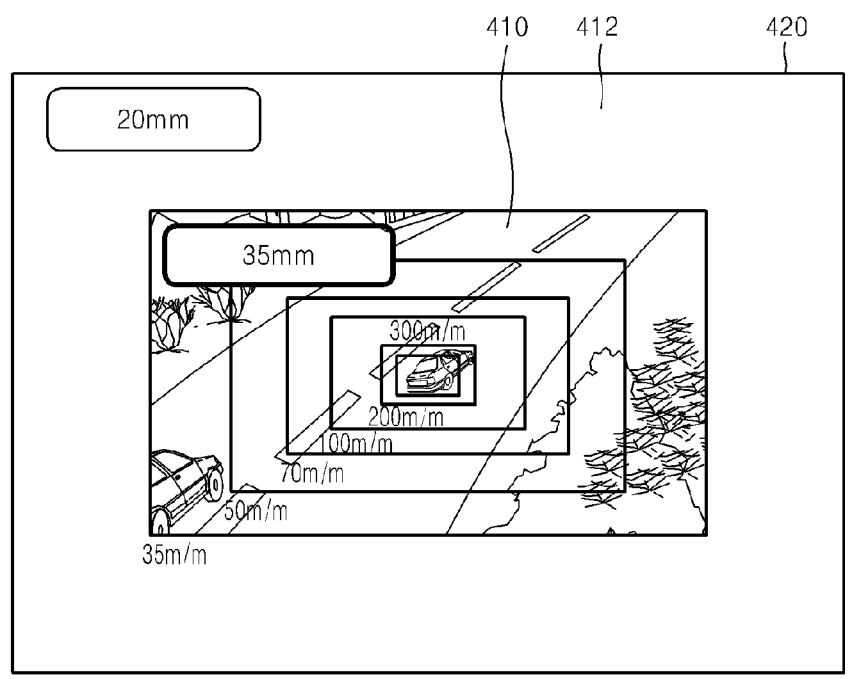

FIG. 4B shows a preview screen 420 when the user selects a 20 mm lens having a shorter focal length than the currently mounted 35 mm lens.

Referring to FIG. 4B, a preview image of an angle of view corresponding to 20 mm is obtained by downsizing a preview image of an angle of view corresponding to 35 mm. Image signal processing for the downsizing is performed by digital zoom processing. In this case, more background may be contained in a picture than in the current preview screen 410.

As a result, although the 35 mm lens is currently mounted on the digital photographing apparatus, the user can see an image corresponding to the focal length of 20 mm in real time.

The preview screen 420 displayed by the display unit 226 shows how much background can be further contained in the picture through the current preview screen 410 and a screen 412 which surrounds the current preview screen 410, when the 20 mm lens is selected in comparison to the currently mounted 35 mm lens.

3. When Lens having Longer Focal Length than Mounted Lens 100 is Selected

Figure 5A:
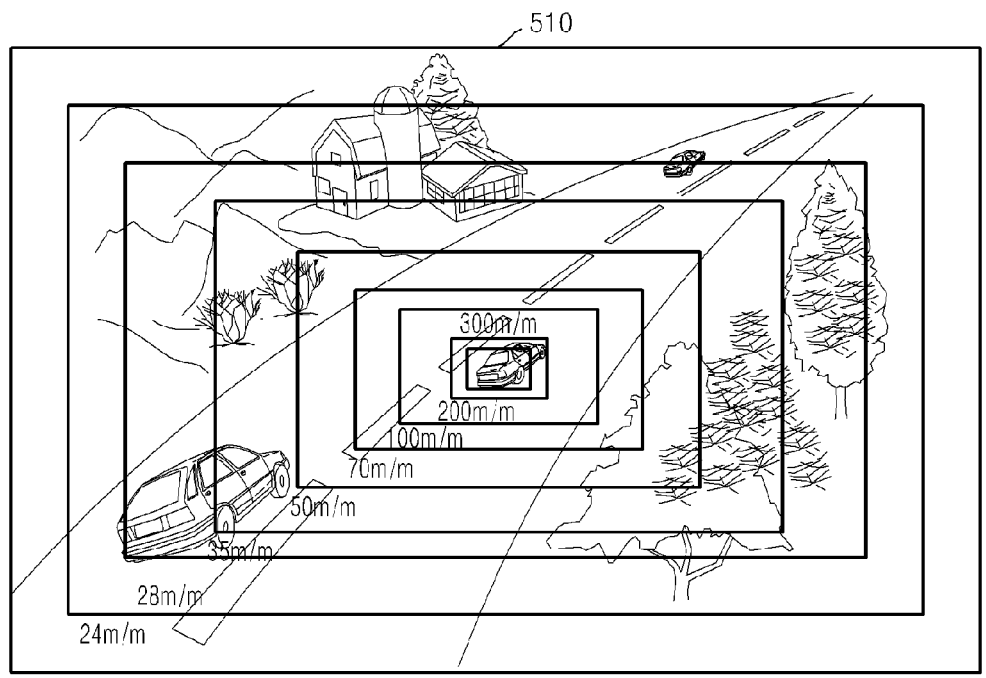

FIG. 5A shows a preview screen 510 when the digital photographing apparatus with a mounted 20 mm lens is powered on.

Figure 5B:
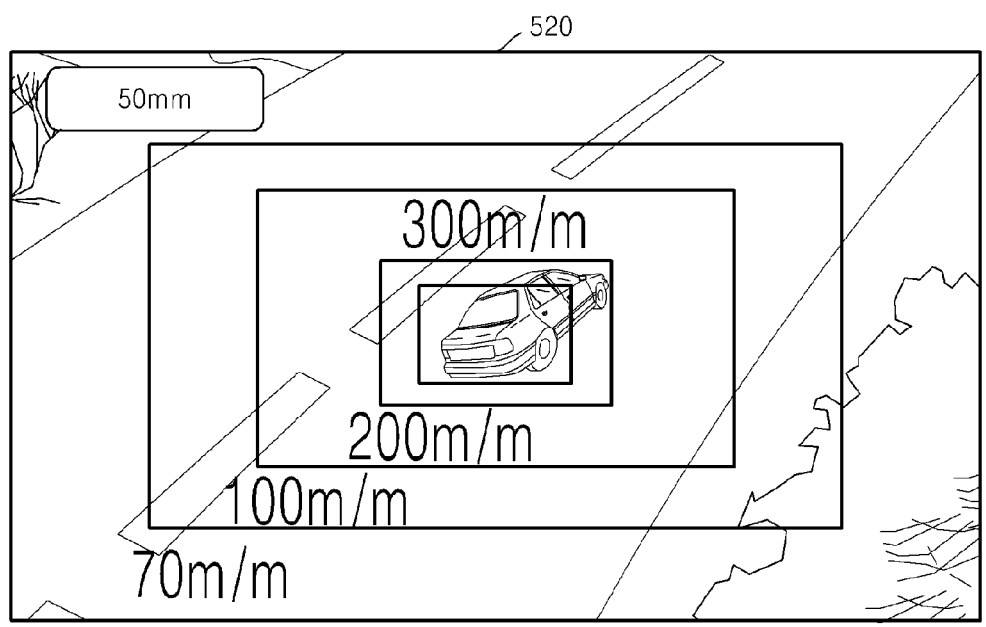

FIG. 5B shows a preview screen 520 when the user selects a 50 mm lens with a longer focal length than the currently mounted 20 mm lens.

Referring to FIG. 5B, a preview image of an angle of view corresponding to 50 mm is obtained by enlarging a preview image of an angle of view corresponding to 20 mm. Image signal processing for the enlargement is performed by digital zoom processing.

As a result, although the 20 mm lens is currently mounted on the digital photographing apparatus, the user can see an image corresponding to the focal length of 50 mm in real time.

4. Zoom-In/Out when 50-200 mm Lens is Selected

The user may zoom as if a lens is actually mounted. In an embodiment of the present invention, the digital photographing apparatus may digitally zoom based on user input.

Figure 6A:
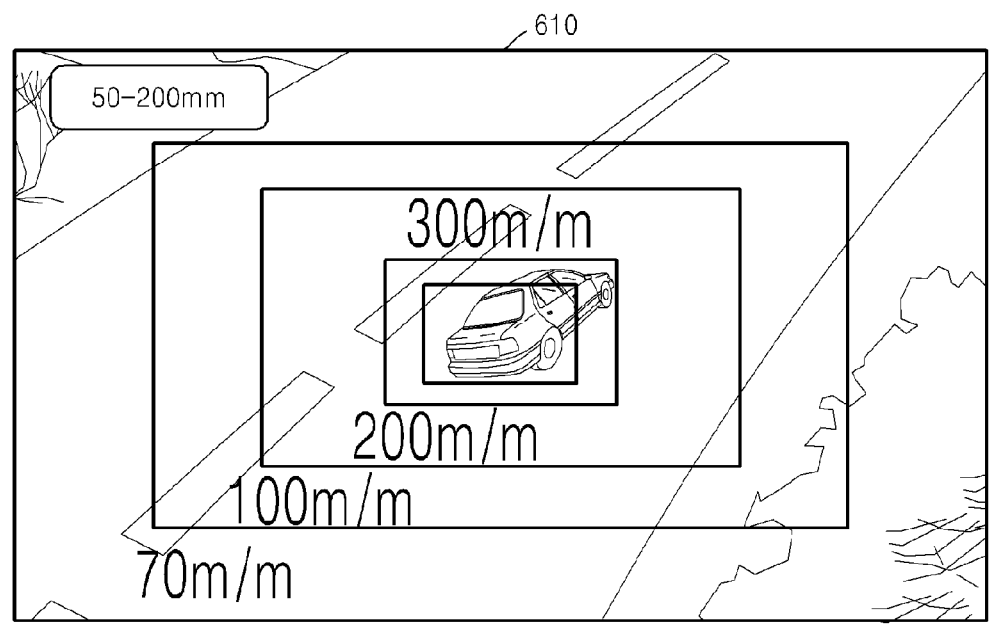

FIG. 6A shows a preview screen 610 when digital zooming out is performed on an image signal when the 50-200 mm lens is selected.

Figure 6B:
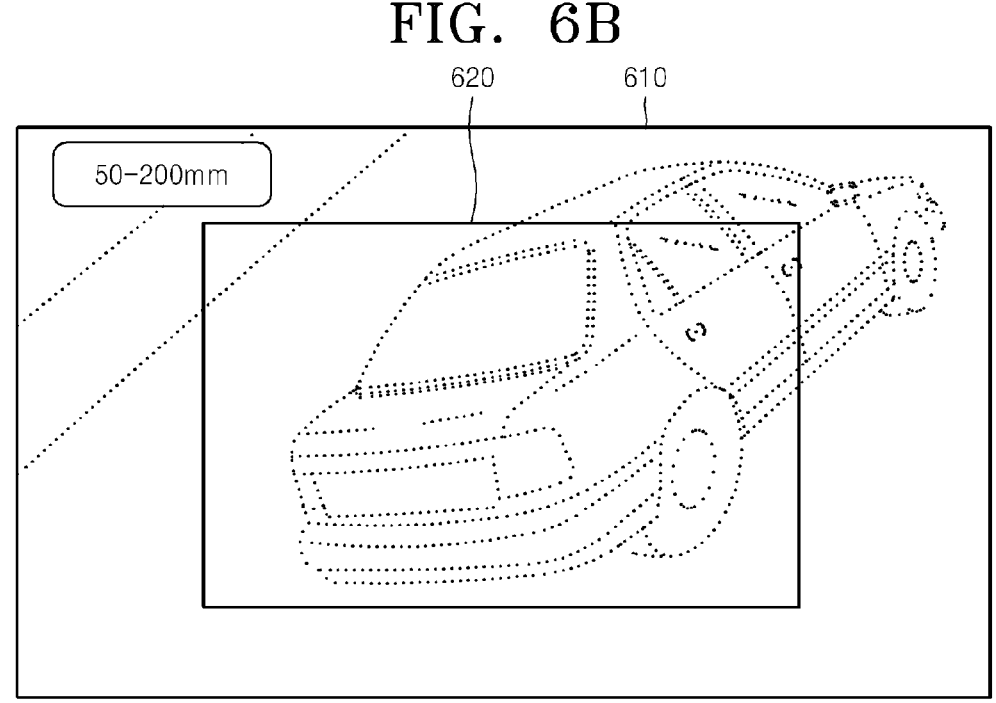

FIG. 6B shows a preview screen 620 when digital zooming in is performed on the image signal when the 50-200 mm lens is selected.

Hereinafter, referring to FIGS. 7 and 8, an operation of the digital photographing apparatus according to embodiments of the present invention will be described.

Method of Controlling Digital Photographing Apparatus

FIG. 7 is a flowchart briefly showing a method of controlling a digital photographing apparatus according to an embodiment of the present invention.

Referring to FIG. 7, in step 710, the imaging device 216 performs imaging with light through a mounted lens to generate an image signal. Upon start of an operation of the digital photographing apparatus, a preview screen is displayed. An image for preview display is directly provided to the DSP 224, and image signal processing, such as pixel interpolation, is performed on the image signal. The image signal, after undergoing image signal processing is displayed in real time as a preview image on the display unit 226.

In step 720, the UI 220 receives a user's selection of one of a plurality of replaceable lenses. The plurality of replaceable lenses include any lens that can be used in the digital photographing apparatus.

The display unit 226 may display specification information such as focal length information regarding lenses in the form of icons (20 mm, 18-55 mm, 50-200 mm) that can be selected by the user. The display unit 226, if implemented with a touch screen, may be, but not limited to, the UI 220, and various changes may be possible without departing from the scope of the present invention.

In step 730, the reading unit 234 reads specification information regarding the selected lens. The reading unit 234 may read specification information regarding the lens previously stored in the memory 222, specification information regarding the lens downloaded in the memory 222 from an external server through the network unit 238, or specification information regarding the lens directly read from the lens itself through the network unit 238.

In step 740, the changing unit 236 changes the image signal based on the read specification information regarding the lens. The changing unit 236 may perform various image signal processing operations, such as digital zoom processing, digital amplification (digital gain adjustment), color correction, gamma (γ) correction, contrast correction, preview display image generation, and so forth for the image signal.

In step 750, the display unit 226 displays the changed image signal as the preview image. The user may manipulate the preview image as if the selected lens is actually mounted.

The user selects a desired digital zoom magnification through the UI 220. The changing unit 236 may then enlarge or downsize the preview image by applying the selected digital zoom magnification.

The user may select an aperture value through the UI 220. The changing unit 236 then may adjust a gain of the imaging device 216 by applying the selected aperture value, thereby adjusting a brightness of the preview image.

By using the UI 220, the user may select a desired lens by repeating the foregoing steps to replace the existing lens with the selected lens or to select another lens.

With the method of controlling the digital photographing apparatus according to the current embodiment, it is possible to solve a problem of the user performing photographing by using the replaceable-lens digital photographing apparatus, and being unable to easily know information about an angle of view and a brightness of a replacement lens until the user physically replaces an existing lens with the replacement lens.

To solve the problem, according to the present invention, by using a preview screen of the digital photographing apparatus and specification information unique to each lens, characteristics of a desired lens are previously shown to the user through a preview screen if the user selects the desired lens through the UI 220 without physically replacing the existing lens with the selected lens, thereby providing a convenient photographing environment to the user.

Figure 8:
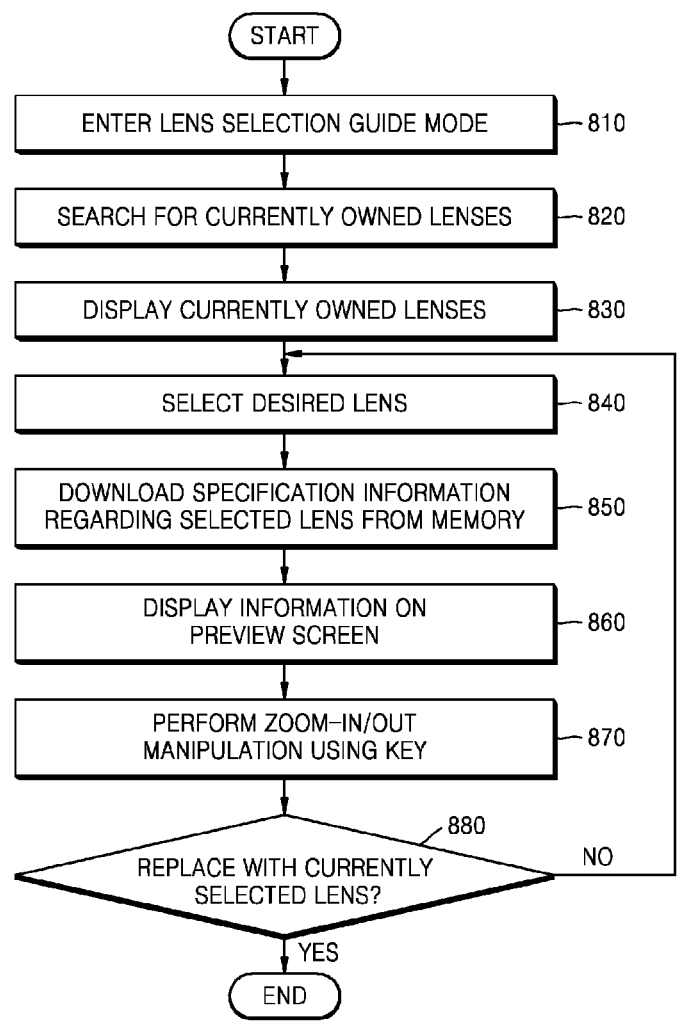
FIG. 8 is a flowchart illustrating a method of controlling a digital photographing apparatus according to another embodiment of the present invention.

FIG. 8 is a flowchart showing a method of controlling a digital photographing apparatus according to another embodiment of the present invention. The present invention is not limited to the method shown in FIG. 8, and various changes may be made thereto without departing from the concept of the present invention.

In step 810, when a photographer wants to know characteristics of a replacement lens before physically replacing an existing lens with the replacement lens, the photographer manipulates the UI 220 to enter a lens selection guide mode.

The reading unit 234 searches for lenses which the photographer currently owns in step 820, and the display unit 226 displays the currently owned lenses in the form of icons on a lower portion of a screen in step 830 (referring to FIG. 3).

If communication, such as WiFi, Bluetooth, or the like, with the lenses is possible through the network unit 238, the reading unit 234 may search for the currently owned lenses. The display unit 226 then displays the found lenses.

The reading unit 234 may read characteristic information regarding lenses that can be used in the digital photographing apparatus if it can communicate with an external server through the network unit 238. The display unit 226 may then display the read characteristic information in the form of icons that can be selected by the photographer.

In step 840, the photographer selects a lens which the photographer desires to know characteristics thereof among the currently owned lenses by using the UI 220, such as by using a displayed key, a touch screen, or the like.

In step 850, the reading unit 234 reads specification information, such as an angle of view, a brightness, a focal length, etc., regarding the selected lens from the memory 222.

In step 860, the changing unit 236 changes an image signal based on the specification information regarding the selected lens read from the memory 222, and the display unit 226 then displays the characteristics on a preview screen.

In step 870, the photographer manipulates the digital photographing apparatus by using a zoom key as if the selected lens is really mounted on the photographing apparatus, thereby checking an angle of view, a focal length, a brightness, and so forth.

Optical zooming is not actually performed, and digital zooming using an image scaler may be performed.

When the focal length of the selected lens is shorter than that of the currently mounted lens 100, an angle of view is increased and since more background can be contained in a picture with the increase in the angle of view, a size of a background that can be obtained regarding the current image size is expressed through a preview window.

In step 880, to check another lens, steps 810 through 870 are repeated until the photographer selects a desired lens based on the preview screen.

The method of controlling a digital photographing apparatus having a replaceable lens mounted thereon according to the present invention may be embodied as a computer-readable code on a computer-readable recording medium. The recording medium may be all kinds of recording devices storing data that is readable by a computer.

Examples of the recording medium include Read-Only Memory (ROM), Random Access Memory (RAM), CD-ROMs, magnetic tapes, floppy disks, optical data storage devices, and carrier waves such as transmission over the Internet. The computer-readable recording medium can also be distributed over a network of coupled computer systems so that the computer-readable code is stored and executed in a decentralized fashion. Function programs, code, and code segments for implementing the content display method may be easily derived by programmers of ordinary skill in the art.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of controlling a digital photographing apparatus, the method comprising:
   generating an image signal by imaging light received by the digital photographing apparatus;
   receiving a selection of a user of one of a plurality of replaceable lenses that are not mounted onto the digital photographing apparatus while the imaging light is received;
   reading specification information regarding the selected lens;
   changing the image signal based on the specification information regarding the selected lens; and
   displaying the changed image signal as a preview image.

2. The method of claim 1, further comprising:
   storing specification information regarding at least one of the plurality of replaceable lenses; and
   displaying the stored specification information regarding the at least one lens which allows the user to select the displayed specification information.

3. The method of claim 1, further comprising:
   searching for specification information regarding at least one of the plurality of replaceable lenses through near-field communication with the at least one lens; and displaying the found specification information regarding the at least one lens to allow the user to select the displayed specification information.

4. The method of claim 1, further comprising:
downloading specification information regarding at least one of the plurality of replaceable lenses from an external server through a network; and
displaying the downloaded specification information regarding the at least one lens which allows the user to select the displayed specification information.

5. The method of claim 1, wherein reading of the specification information regarding the selected lens comprises:
reading at least one of previously stored specification information regarding a lens, specification information regarding a lens downloaded from an external server through a network, and specification information regarding a lens found from the lens through near-field communication with the lens.

6. The method of claim 1, further comprising:
receiving a digital zoom signal regarding the displayed preview image;
enlarging or downsizing the changed image signal based on the input digital zoom signal and the specification information regarding the selected lens; and
displaying the enlarged or downsized image signal as the preview image.

7. The method of claim 1, further comprising:
receiving an aperture value regarding the displayed preview image;
adjusting a brightness of the changed image signal based on the specification information regarding the selected lens and the aperture value; and
displaying the brightness adjusted image signal as the preview image.

8. The method of claim 1, wherein the specification information regarding the selected lens comprises:
a focal length of the selected lens, and if the focal length of the selected lens is shorter than a focal length of the mounted lens,
downsizing the image signal based on the focal length of the selected lens; and
displaying the downsized image signal and a margin as the preview image.

9. The method of claim 1, wherein the specification information regarding the selected lens comprises:
a focal length of the selected lens, and if the focal length of the selected lens is longer than a focal length of the mounted lens,
enlarging the image signal based on the focal length of the selected lens; and
displaying the enlarged image signal as the preview image.

10. A digital photographing apparatus, the digital photographing apparatus comprising:
an imaging device for generating an image signal by imaging light received by the digital photographing apparatus;
a user interface for receiving a selection of a user of one of a plurality of replaceable lenses that are not mounted onto the digital photographing apparatus while the imaging light is received;
a reading unit for reading specification information regarding the selected lens;
a changing unit for changing the image signal based on the specification information regarding the selected lens; and
a display unit for displaying the changed image signal as a preview image.

11. The digital photographing apparatus of claim 10, further comprising:
a memory for storing specification information regarding at least one of the plurality of replaceable lenses; and
a display unit for displaying the stored specification information regarding the at least one lens to allow the user to select the displayed specification information.

12. The digital photographing apparatus of claim 10, further comprising:
a network unit for searching for specification information regarding at least one of the plurality of replaceable lenses through near-field communication with the at least one lens, wherein the display unit displays the found specification information regarding the at least one lens to allow the user to select the displayed specification information.

13. The digital photographing apparatus of claim 10, further comprising:
a network unit for downloading specification information regarding at least one of the plurality of replaceable lenses from an external server through a network, wherein the display unit displays the downloaded specification information regarding the at least one lens to allow the user to select the displayed specification information.

14. The digital photographing apparatus of claim 10, wherein the reading unit is adapted to read at least one of previously stored specification information regarding a lens, specification information regarding a lens downloaded from an external server through a network, and specification information regarding a lens found from the lens through near-field communication with the lens.

15. The digital photographing apparatus of claim 10, wherein the user interface is adapted to receive a digital zoom signal regarding the displayed preview image,
the changing unit is adapted to enlarge or downsize the changed image signal based on the input digital zoom signal and the specification information regarding the selected lens, and
the display unit is adapted to display the enlarged or downsized image signal as the preview image.

16. The digital photographing apparatus of claim 10, wherein the user interface is adapted to receive an aperture value regarding the displayed preview image,
the changing unit is adapted to adjust a brightness of the changed image signal based on the specification information regarding the selected lens and the aperture value, and
the display unit is adapted to display the brightness adjusted image signal as the preview image.

17. The digital photographing apparatus of claim 10, wherein the specification information regarding the selected lens comprises a focal length of the selected lens, and
the changing unit is adapted to downsize the image signal based on the focal length of the selected lens, when the focal length of the selected lens is shorter than a focal length of the mounted lens and
the display unit is adapted to display the downsized image signal and a margin as the preview image.

18. The digital photographing apparatus of claim 10, wherein the specification information regarding the selected lens comprises a focal length of the selected lens, and
the changing unit is adapted to enlarge the image signal based on the focal length of the selected lens, when the focal length of the selected lens is longer than a focal length of the mounted lens, and the display unit is adapted to display the enlarged image signal as the preview image.

19. The digital photographing apparatus of claim 10, further comprising:
a display unit for displaying the mounted lens and a portion of the plurality of replaceable lenses which are not mounted.

20. A non-transitory computer-readable recording medium having recorded thereon a program for performing a method of controlling a digital photographing apparatus, the method comprising:
generating an image signal by imaging light received through the mounted lens;
receiving a selection of a user of one of a plurality of replaceable lenses that are not mounted onto the digital photographing apparatus while the imaging light is received;
reading specification information regarding the selected lens;
changing the image signal based on the specification information regarding the selected lens; and
displaying the changed image signal as a preview image.

\* \* \* \* \*